United States Patent
Schamin et al.

(10) Patent No.: US 12,184,129 B2
(45) Date of Patent: Dec. 31, 2024

(54) GROUNDING APPARATUS HAVING AN AIR PASSAGE, AND ELECTRICAL DRIVE ASSEMBLY HAVING THE GROUNDING APPARATUS

(71) Applicant: Schaeffler Technologies AG & Co. KG, Herzogenaurach (DE)

(72) Inventors: Alexander Schamin, Oberasbach (DE); Sebastian Giehl, Burgebrach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 236 days.

(21) Appl. No.: 17/783,358

(22) PCT Filed: Nov. 26, 2020

(86) PCT No.: PCT/DE2020/101002
§ 371 (c)(1),
(2) Date: Jun. 8, 2022

(87) PCT Pub. No.: WO2021/115530
PCT Pub. Date: Jun. 17, 2021

(65) Prior Publication Data
US 2023/0015934 A1    Jan. 19, 2023

(30) Foreign Application Priority Data
Dec. 11, 2019 (DE) .............................. 102019133886

(51) Int. Cl.
*H02K 11/40* (2016.01)
*H02K 5/124* (2006.01)

(52) U.S. Cl.
CPC ............. *H02K 11/40* (2016.01); *H02K 5/124* (2013.01)

(58) Field of Classification Search
CPC .... F16C 19/52; F16C 2380/26; F16C 33/726; F16C 33/76; F16C 41/002; H02K 11/40;
(Continued)

(56) References Cited

U.S. PATENT DOCUMENTS

2010/0127585 A1* 5/2010 Fee .................. H02K 11/40
310/71

FOREIGN PATENT DOCUMENTS

| CN | 104736411 B | 7/2017 |
| CN | 106411022 | 1/2019 |

(Continued)

OTHER PUBLICATIONS

TW-201108531-A, Hiler, all pages (Year: 2011).*
(Continued)

*Primary Examiner* — Naishadh N Desai
(74) *Attorney, Agent, or Firm* — Volpe Koenig (57) ABSTRACT

A grounding apparatus for an electrical drive assembly configured for conducting an electrical charge and/or voltage from a rotor of an electric motor via a shaft as a first grounding partner to a second grounding partner. The grounding apparatus has: a supporting body device with a connecting section for electrical and mechanical connection to one of the grounding partners, and a supporting section; a contacting device having a contacting section for electrical connection to the other of the grounding partners, the contacting device having an attachment section and being connected to the supporting section of the supporting body device via the attachment section. The grounding apparatus bridges an annular gap between one grounding partner and the other, and the grounding apparatus has at least one opening which forms or helps to form an air passage in the annular gap in an axial direction.

20 Claims, 5 Drawing Sheets

(58) Field of Classification Search
CPC .... H02K 2205/09; H02K 5/124; H01R 13/03;
H01R 4/62; H01R 43/16; Y02E 60/10;
B23B 2222/04; B23B 2222/21; B23B
35/00; H01M 50/562; H01M 50/566
See application file for complete search history.

(56) References Cited

FOREIGN PATENT DOCUMENTS

| | | | | |
|---|---|---|---|---|
| CN | 104912935 B | 2/2019 | | |
| CN | 109638587 B | 5/2021 | | |
| DE | 102011007255 A1 | 10/2012 | | |
| DE | 102012219819 | 4/2014 | | |
| DE | 102013000982 | 7/2014 | | |
| DE | 102013000982 A1 * | 7/2014 | ............ | F16J 15/002 |
| DE | 102016010926 | 9/2017 | | |
| DE | 102017210867 A1 | 1/2019 | | |
| DE | 102018107408 | 10/2019 | | |
| DE | 102018107408 A1 * | 10/2019 | ........... | H01R 39/085 |
| JP | 2015207533 | 11/2015 | | |
| JP | 2015207533 A * | 11/2015 | | |
| TW | 201108531 A * | 3/2011 | ............ | F16C 41/002 |
| WO | 2017220693 A1 | 12/2017 | | |

OTHER PUBLICATIONS

JP-2015207533-A, Yazaki, all pages (Year: 2015).*
DE-102013000982-A1, Colineau, all pages (Year: 2015).*
DE-102018107408-A1, Hemetsberger, all pages (Year: 2019).*

* cited by examiner

GROUNDING APPARATUS HAVING AN AIR PASSAGE, AND ELECTRICAL DRIVE ASSEMBLY HAVING THE GROUNDING APPARATUS

CROSS-REFERENCE TO RELATED APPLICATIONS

This application is the U.S. National Phase of PCT Appln. No. PCT/DE2020/101002, filed Nov. 26, 2020, which claims priority from German Patent Application No. DE 10 2019 133 886.7, filed Dec. 11, 2019, the entire disclosures of which are incorporated by reference herein.

TECHNICAL FIELD

The disclosure relates to a grounding apparatus for conducting an electrical charge and/or voltage from a rotor of an electric motor via a shaft as a first grounding partner to a second grounding partner. The disclosure also relates to an electric drive assembly with the grounding apparatus.

BACKGROUND

In electric vehicles or hybrid vehicles, an electric machine is used as a traction motor. While the electric machine seems to work with little or no wear and, in particular, very few problems when viewed superficially, problems arise on closer inspection which can be attributed to the functioning of the electric machines. It is known that a voltage and/or charge is induced in the rotor of the electric machine, so that a potential difference of several 100 V can build up between the rotor and a housing.

The rotor is usually designed in one piece with a rotor shaft or is mechanically connected, and there is also electrical contact between the rotor and the rotor shaft, so that the potential difference is present between the rotor shaft and the housing at the same time. The rotor shaft is usually mounted relative to the housing via a rotor bearing or rotor shaft bearing. Due to the potential difference, discharges occur between the rolling elements and the rolling element tracks in the rotor shaft bearings, wherein the rolling element tracks are damaged.

Document DE 10 2013 000 982 A1, which probably represents the closest prior art, relates to a buffer seal, wherein the buffer seal is arranged directly in front of a seal. The sealing arrangement thus formed seals a shaft as a first sealing partner from a housing as a second sealing partner. In at least one embodiment, the front seal is formed from a nonwoven material, so that it is air-permeable.

SUMMARY

The object of the disclosure is to propose a grounding apparatus which has improved functional properties. This object is achieved by a grounding apparatus having one or more of the features of disclosed herein and by an electric drive assembly having one or more of the features disclosed herein. Preferred or advantageous embodiments result from the claims, the following description, and the attached figures.

The disclosure relates to a grounding apparatus which is designed and/or is suitable in particular for an electric drive assembly. The drive assembly is preferably designed and/or is suitable for a vehicle. The vehicle is preferably designed as a passenger car, bus, or truck. In alternative configurations, the vehicle can also be designed as a bicycle, motorcycle, e-scooter and/or one-track or two-track and/or one-axle or two-axle. The vehicle is designed as an electric vehicle, in particular as a purely electric vehicle or as a hybrid vehicle.

The electric drive assembly serves in particular to create and/or provide a traction torque, in particular a main traction torque, for the vehicle. The electric drive assembly can be coupled or is coupled to an energy device, in particular to an energy storage device, in particular to a battery or storage battery, to obtain energy for generating the traction torque.

The electric drive assembly includes an electric motor section. An electric motor, also referred to as an electric machine, is arranged in the electric motor section. The electric motor is preferably designed as an asynchronous electric motor. Preferably, the electric motor defines a main axis. The electric motor has a stator and a rotor, which are arranged concentrically and/or coaxially to one another. Furthermore, the electric motor section has a shaft, wherein the shaft is connected to the rotor in terms of transmission technology. In particular, the shaft is driven via and/or by the rotor. The shaft is particularly preferably designed as a rotor shaft. In particular in the configuration as a rotor shaft, this can be connected to the rotor in a rotationally fixed, rigid, and/or integral manner. Furthermore, it is provided that the shaft is electrically connected to the rotor. This means that if there is a potential difference between the rotor and a surrounding structure, the same potential difference will exist between the shaft and the surrounding structure.

The electric drive assembly has a transmission section, wherein a transmission device is arranged in the transmission section. The transmission device can be designed as a clutch device and/or as a shifting device and/or as a transmission system. The shaft is connected to the transmission device in terms of transmission technology, in particular the shaft forms an input shaft into the transmission device.

The grounding apparatus has the function of grounding an electrical charge and/or electrical voltage from the rotor via the shaft, wherein the shaft forms a first grounding partner. The conducting takes place to a second grounding partner. The second grounding partner is designed in particular as a stationary grounding partner. The second grounding partner is preferably designed as a housing section or as a surrounding construction or component which is connected to the housing section in an electrically conductive manner. In particular, the housing section is connected to ground and/or is grounded. In particular, the grounding apparatus forms an electrical connection between the first grounding partner and the second grounding partner. In particular, there is a permanent electrical connection between the grounding partners, which is present in both a stationary and a dynamic manner, i.e., during operation of the electrical drive assembly.

The grounding apparatus has a supporting body device which in particular forms a support for one or more grounding components of the grounding apparatus. The supporting body device has a connecting section, wherein this is used for the direct or indirect mechanical connection to one of the grounding partners, in particular so that the grounding apparatus is fixed to this grounding partner. Furthermore, the connecting section is used for the direct or indirect electrical connection with this grounding partner. The mechanical and electrical connection can coincide, but these can also be implemented side by side or in parallel with one another. In addition, the supporting body device has a supporting section, wherein this provides an attachment section interface for the mechanical and electrical attachment of the at least one grounding component.

Furthermore, the grounding apparatus has a contacting device which implements a grounding function as an electrically conductive grounding component. The contacting device has a contacting section, wherein this is used for direct or indirect electrical connection to the other of the grounding partners. For this purpose, for example, the contacting section can be electrically connected directly to the other grounding partner. Alternatively, however, the contacting section can also be indirectly electrically connected to the other grounding partner, for example via an electrically conductive intermediate component arranged on the shaft. In addition, the contacting device has an attachment section, via which the contacting device is connected to the supporting section of the supporting body device. The attachment section is preferably connected indirectly to the first-mentioned grounding partner via the supporting body device, in particular the supporting section.

Provision is made for the grounding apparatus to be designed to bridge an annular gap between one and the other grounding partner. The grounding apparatus preferably has the shape of a circular ring, wherein the inside diameter and the outside diameter are adapted to or correspond to the inside diameter and outside diameter of the respective grounding partner. The grounding apparatus is preferably designed to be continuous in the direction of rotation around the main axis.

In the context of the disclosure, it is proposed that the grounding apparatus has at least one opening, which forms or helps to form an air passage in the annular gap in an axial direction. The opening cross-section of the opening and/or the air passage is preferably larger than 2 square millimeters, in particular larger than 4 square millimeters. In particular, the opening forms at least or precisely one continuous channel in the axial direction as an air passage or part of an air passage.

It is a consideration of the disclosure that due to the relative rotational movement of the grounding partners to one another, in particular the shaft relative to the surrounding structure, or due to temperature changes, there can be a pressure difference upstream and downstream of the grounding apparatus, wherein the pressure difference passing through the at least one opening can be reduced in a functionally reliable and, in particular, contamination-proof manner in the annular gap. By reducing the pressure difference, it is avoided that the grounding apparatus is loaded in the axial direction by the pressure difference and can shift or tilt during continuous operation. The result of this is that the functional properties of the grounding apparatus and thus of the electrical drive assembly are improved, in particular in continuous operation.

In one possible embodiment, it is provided that the at least one opening is designed as a through-opening, which is thus arranged in a radial region between the outer diameter and the inner diameter of the grounding apparatus. In particular, the through-opening is designed to be closed all the way around. Alternatively or additionally, the opening is designed as an opening at the edge, which is delimited on a radial side by one of the grounding partners. This configuration has the advantage that the annular ring of the grounding apparatus is not weakened by the opening and is therefore more stable in continuous operation. Provision can be made for the grounding apparatus to have at least one through-opening and at least one edge-side opening.

Provision can be made for the at least one opening to be arranged in the supporting body device and/or in the contacting device. For example, the opening can be designed with a constant, free diameter in the axial course.

In a possible development according to the disclosure, the supporting body device has a support part and a retaining part—also referred to below as parts—which together hold the attachment section. The parts are particularly preferably designed as metallic parts, in particular formed sheet metal reshaped parts. In particular, the attachment section is arranged in the axial direction between the support part and the retaining part. The support part and the retaining part are preferably designed as two separate components, which are connected to one another in at least or exactly one connecting region by a reshaping process. It is provided that the at least one opening is formed by the connecting region. For example, clinching, toxing, or press-joining are used as reshaping processes.

In one possible embodiment, one part, i.e., the support part or the retaining part, has a connecting opening and the other part, i.e., the retaining part or the support part, has a reshaping region which at least engages in the connecting opening or even extends therethrough to form the reshaping region, wherein at the same time the at least one opening is kept free. For example, the reshaping region can be designed as an open hollow rivet region, wherein the hollow rivet region has a hollow-cylindrical neck which is adjoined by a collar which forms a closing head. The collar lies circumferentially, preferably closed circumferentially, against an edge of the connecting opening and in this way secures the connection. This manufacturing process can also be referred to as pass-through riveting.

In principle, the contacting section can be formed by one or more, preferably elastically deformable, filaments, strips, or circular ring segments. Preferably, however, the contacting section and/or the contacting device is designed as a ring-shaped or annular component, wherein the contacting section is preferably designed to be concentric to the shaft and/or to the housing section.

In the basic form thereof, the contacting section is particularly preferably designed as an open or closed ring disk and/or blank, wherein the contacting section has an opening, in particular a central hole, for receiving the shaft. The contacting section is preferably deformed and/or deformable in the axial direction in the form of a plate or a shaft.

In principle, the contacting device and/or the supporting body device can be made of an electrically conductive metal or a metal alloy, e.g., steel, copper or aluminum. In particular, the contacting device and the supporting body device can be made of different electrically conductive materials.

Alternatively, the contacting device and/or the supporting body device are made from a composite material and/or a composite material which has electrically conductive properties. For example, the composite material is made from a graphite-copper-resin composite mixture.

Alternatively, the contacting device and/or the supporting body device is provided with an electrically conductive coating. For example, the coating can be applied to the contacting section as a particle, layer or fiber composite material.

Alternatively, the contacting device, in particular the contacting section, can be formed from electrically conductive fibers. In particular, these fibers can be present as loose fibers, as a yarn, or as a woven fabric. As a fabric, the electrically conductive fibers can be processed, for example, into a felt or into a woven, embroidered, or tufted fabric layer. The fabric can be formed entirely or partially from electrically conductive fibers and partially from other fibers, such as plastic fibers. The electrically conductive fibers are preferably designed as metallic fibers or as filled or coated polymer fibers, but particularly preferably as carbon fibers.

The contacting section preferably has electrically conductive fibers, wherein the electrically conductive fibers are preferably formed at least in a region of the contacting section of the contacting device. The contacting section has an adhesive layer for embedding the electrically conductive fibers, wherein the adhesive layer is preferably designed for connecting the electrically conductive fibers to the contacting section in a material-fit manner. The adhesive layer preferably forms an adhesive bed for the electrically conductive fibers. The adhesive layer is preferably formed from an electrically conductive adhesive, wherein the adhesive is designed, for example, as a dispersion adhesive or as a solvent-based adhesive. The adhesive layer is applied to the contacting section, wherein the adhesive layer is preferably applied to the contacting section by spraying, rolling, brushing, or by dipping the contacting section, or by a pad-printing or screen-printing process. In particular, the adhesive layer is curable, so that the electrically conductive fibers can be introduced into the adhesive layer in a wet and/or liquid and/or viscous state and are bonded in a material-fit manner to the contacting section after the adhesive layer has cured and/or solidified. The electrically conductive fibers are preferably embedded with one of the ends thereof in the adhesive layer, wherein the other ends are designed as free ends of the electrically conductive fibers.

Furthermore, the electrically conductive fibers are arranged on the contacting section for the electrical connection to one of the grounding partners, in particular the second grounding partner. In particular, the free ends of the electrically conductive fibers are designed so that they can be placed on one of the grounding partners for electrically connecting with the contacting section. The electrically conductive fibers are particularly preferably in covering contact with one of the grounding partners. The electrically conductive fibers are preferably held elastically in the adhesive layer, so that when the electrically conductive fibers are in contact with one of the grounding partners, flexible deformation of the electrically conductive fibers results in a dimensional overlap of the electrically conductive fibers with one of the grounding partners. The overlapping of the electrically conductive fibers on the grounding partner can preferably be seen as a sliding contact, wherein the sliding contact forms an electrical connection between one of the grounding partners and the contacting section of the contacting device via the covering electrically conductive fibers. In particular, the electrically conductive fibers are in direct or indirect contact with one of the grounding partners, for example via a sleeve, wherein when the grounding partners rotate relative to one another, the electrically conductive fibers rub against a contact point and form the sliding contact, so that a permanent electrical connection for conducting the electrical charge and/or voltage of the shaft is created as the first grounding partner via the grounding apparatus to the second grounding partner. The electrically conductive fibers preferably have a fiber length of at least 0.1 mm, in particular at least 0.2 mm, especially at least 0.3 mm, and/or wherein the electrically conductive fibers preferably have a maximum fiber length of 20 mm, in particular a maximum of 10 mm, especially a maximum of 5 mm.

It is advantageous that the contacting section with the electrically conductive fibers creates a grounding apparatus which compensates for tolerances and/or distances between the components, in particular between rotating components and static components, so that a reliable contact for conducting the electrical charge and/or voltage between the two grounding partners is guaranteed. For example, a break in the contact between the rotating shaft during operation and the grounding apparatus supported in a stationary manner can be avoided. Furthermore, it is advantageous that the surface properties can be determined by the choice of the material of the electrically conductive fibers, wherein a roughness of the contacting section can be determined, for example, so that a grounding apparatus with improved wear properties is created. This also reduces wear debris, e.g., as particles, at a contact point of the grounding apparatus with one of the grounding partners. Furthermore, it is advantageous that the attachment of the electrically conductive fibers to the contacting section via the adhesive layer creates a cost-effective grounding apparatus.

In a preferred embodiment, the electrically conductive fibers are in the form of carbon fibers. The carbon fibers, also referred to as coal fibers or as carbon or carbon fibers, are preferably made from a carbon-containing starting material which can be carbonized into carbon in a pyrolysis process. The carbon fibers are designed to be electrically conductive and are preferably applied to the contacting section by a flocking process. The carbon fibers are embedded in the adhesive layer, wherein the adhesive layer bonds the carbon fibers to the contacting section in a material-fit manner. The contacting section is electrically connected to one of the grounding partners via the carbon fibers; in particular, the carbon fibers form the sliding contact between the contacting section and one of the grounding partners. Alternatively, the electrically conductive fibers are formed as derivatives of carbon fibers, as metallic fibers or as filled polymer fibers.

In an advantageous development, the grounding apparatus has an abrasion protection device. The abrasion protection device has the function of protecting the electric motor against wear debris from the contacting device. In particular, the wear debris is generated during operation of the electric motor due to friction during a relative movement between the two grounding partners. The abrasion protection device is arranged or can be arranged on the side of the electric motor of the contacting device to avoid or at least reduce a transfer of the wear debris from the contacting device to the electric motor. In particular, the abrasion protection device is designed and/or is suitable for covering and/or sealing a transition region between the supporting body device and the grounding partner that is directly or indirectly connected to the contacting device. The abrasion protection device particularly preferably forms a wear debris-proof partition in the direction of rotation around the main axis.

The advantage of the development consists in particular of the fact that the wear debris generated during operation of the electric motor is kept away from the electric motor, and that the function of the electric motor is therefore not impaired. This can ensure safe operation of the electric motor.

The use of the abrasion device and the opening of the grounding apparatus complement each other, since the direct path for the wear debris is closed by the abrasion device and the indirect path via the opening acts like a labyrinth seal, so that the wear debris is effectively held back.

In a preferred embodiment, it is provided that the abrasion protection device extends circumferentially, in particular in the direction of rotation around the main axis, between the two grounding partners without interruption and/or overlapping the contacting device to shield the contacting device from the electric motor in the direction of rotation. In particular, "uninterrupted" should be understood to mean that the abrasion protection device has no interruptions, openings, or the like. In particular, "overlapping" should be understood to mean that the abrasion protection device and the contacting device overlap at least partially or completely, at least in an axial view with respect to the main axis. In particular, the abrasion protection device and the contacting device are congruent with one another. The contacting device and optionally the abrasion protection device are particularly preferably designed in the shape of a ring or a circular ring. An abrasion protection device is thus proposed which largely or even completely shields the contacting device from the electric motor.

In a further preferred embodiment, it is provided that the abrasion protection device has a circumferential sealing lip. In particular, a touching, preferably a dynamic, seal is implemented by the sealing lip. The sealing lip lies directly against a sealing partner in the direction of rotation. The sealing lip is preferably made of an elastic material, for example rubber, so that the sealing lip bears against the sealing partner in a sealing manner in the circumferential direction, in particular in a fluid-tight manner. The sealing partner can be formed by one of the grounding partners, in particular the shaft, or possibly by the intermediate component. The abrasion protection device is preferably implemented in the form of a shaft lip seal. By the sealing lip is proposed an abrasion protection device which is characterized by a particularly high degree of sealing and thus the entry of wear debris into the electric motor is significantly reduced or prevented.

In a further specification, it is provided that the abrasion protection device is designed as an annular sealing disk. The sealing disk preferably has the sealing lip on the inner and/or outer circumference thereof. The sealing disk is preferably formed from the elastic material, so that the sealing disk is flexible. The sealing disk is particularly preferably designed in the shape of a circular ring, so that it encircles the axis of rotation in an installation situation. The sealing disk is preferably arranged to be coaxial with respect to the axis of rotation. An abrasion protection device is thus proposed which can be installed in a simple manner and at the same time provides a high level of protection against wear debris.

In a design implementation, it is provided that the supporting section provides an attachment section interface for the mechanical and electrical attachment of the contacting device and for the mechanical attachment of the abrasion protection device. For this purpose, the contacting device and the abrasion protection device each have an attachment section, via which they are connected to the supporting section of the supporting body device. The abrasion protection device and the contacting device can be connected to the supporting section via the attachment sections in a positive-fit and/or non-positive-fit and/or a material-fit manner.

In one possible embodiment, the supporting section is flanged as a foldover around one edge of the attachment section or sections to connect them to one another. In particular, the supporting body device, the contacting device and optionally additionally the abrasion protection device are thus joined to one another, preferably non-detachably, by reshaping. The foldover is understood in particular by bending or folding an edge of the supporting section by 180 degrees. In particular, a foldover is also understood to mean what is known as a doubling or what is known as a fold, which can be produced, for example, by folding or swivel-bending.

The supporting body device preferably has expansion regions, preferably several expansion regions, in particular at least or exactly two expansion regions. The supporting body device particularly preferably has at least or exactly three expansion regions. The expansion regions are preferably designed in the basic form thereof as elongated wings or as resilient tabs or as claws or as teeth. The expansion regions are preferably reshaped in relation to the supporting body device, so that the expansion regions extend at an angle from the supporting body device. Due to the reshaping of the expansion regions, the supporting body device is designed to be expandable against one of the grounding partners. The expansion regions form an expansion connection between the supporting body device and one of the grounding partners. Furthermore, the expansion regions form the connecting section, wherein the expansion regions serving for the mechanical and electrical connection, in particular for the direct or indirect mechanical and electrical connection, with one of the grounding partners. Preferably, the expansion connection can be understood as a resilient expansion of the supporting body device via the expansion regions against the one grounding partner, but preferably against the second grounding partner. The grounding apparatus is designed to be supportable and/or supported on one of the grounding partners by the supporting body device with expansion regions, preferably in the radial direction, in relation to the shaft and/or rotor shaft. The grounding apparatus is preferably clamped resiliently and/or flexibly on one of the grounding partners, wherein the expansion regions preferably exert a radial spring and/or expanding force for radially supporting the grounding apparatus against one of the grounding partners.

The at least one opening can be formed or helped to be formed by the gaps between the expansion regions in the circumferential direction. In particular, this is designed as a peripheral opening.

It is advantageous that the supporting body device with expansion regions proposes a grounding apparatus which can be arranged at different positions in the drive assembly for electrical grounding, wherein small or large radial distances can be bridged by the grounding apparatus, so that a high level of design freedom is created. The grounding apparatus can be connected in particular to the housing section via the expansion regions, wherein the expansion regions for example claw into a surface of the housing section or alternatively are coupled to the shaft and/or rotor shaft in a torque-proof manner. This also means that the grounding apparatus can be installed easily. Furthermore, it is advantageous that the resilient and/or flexible radial support of the expansion regions allows large tolerances between the two grounding partners to be bridged, for example due to an imbalance in the shaft, so that a more reliable grounding apparatus is created. It is also advantageous that no surface treatment and/or preparation of a seat on one of the grounding partners is necessary for the installation of the grounding apparatus, wherein the grounding apparatus can easily be retrofitted for the drive assembly due to the expansion connection, so that a cost-effective drive assembly is created.

In a preferred embodiment, it is proposed that the supporting body device has a base body region and at least one clamping region. The base body region can preferably be seen as a supporting base body of the grounding apparatus, wherein the clamping region is preferably designed for a clamped connection to the attachment section. The clamping region preferably generates a clamping force to establish the clamping connection, wherein the clamping force is transmitted and/or transmittable to the attachment section. Furthermore, the clamping region is connected to the base body region via at least one of the expansion regions. The base body region and the expansion regions are preferably designed in one piece. The base body region, the expansion regions and the clamping region are particularly preferably designed in one piece, wherein these are preferably made of a resilient and electrically conductive material, e.g., an electrically conductive metal. The attachment section is clamped between the base body region and the at least one clamping region.

The attachment section is preferably mechanically connected directly or indirectly to the base body region and the clamping region. The supporting body device preferably has one or more connecting parts, wherein the connecting parts are arranged between the attachment section and the base body region and/or the clamping region. The connecting parts are preferably designed to enlarge a connecting region between the base body region or the clamping region and the attachment section, so that the holding force can be transmitted to the attachment section over the entire connecting region. The base body region and the clamping region are particularly preferably designed for the electrical connection of the contacting device to the supporting body device. In particular, the base body region and the clamping region are designed as an electrical connection for the attachment section. The connecting part is particularly preferably also inserted and clamped between the attachment section and the clamping region. The connecting part is preferably formed from an electrically conductive material, for example an electrically conductive metal. Alternatively or optionally additionally, the connecting part is made of a soft material, for example a plastic or aluminum material, so that the clamping regions claw and/or hook into the connecting part or at least deform same in a holding manner. In the case of a non-electrically conductive connecting part, at least the base body region or the clamping region must be connected directly to the attachment section to ensure electrical conductivity of the grounding apparatus.

The expansion regions are preferably deformed by 180 degrees around the attachment section, so that the expansion regions carry the connecting section for one of the grounding partners on the one hand and the clamping regions for clamping the attachment section on the other. The expansion regions are preferably bent over in such a way that the expansion regions are supported resiliently and/or flexibly on one of the grounding partners and clamp the attachment section.

The supporting body device is particularly preferably designed as a toothed ring and/or as a clamping ring. The toothed ring is preferably designed so that it can be arranged to be concentric around the shaft and/or rotor shaft, wherein the toothed ring has the base body region, the clamping regions, and the multiple expansion regions. The expansion regions are preferably arranged in the circumferential direction around the toothed ring and are designed to be uniformly spaced apart from one another. The toothed ring can be designed for bores with external expansion regions or for shafts with internal expansion regions. Depending on the design and use, the expansion regions are arranged on an outside diameter or on an inside diameter of the toothed ring. The contacting device is preferably designed as a ring and/or as a curved annular disk or as a cup spring, wherein the expansion regions of the toothed ring preferably encompass the contacting device, and the clamping regions secure the contacting device.

In an alternative embodiment, it is proposed that the supporting body device has an expansion support part with the expansion regions and a base body region as the support part and a retaining support part with at least one coupling region and a clamping region as the support part. In particular, the expansion support part and the retaining support part are designed in two parts and/or as separate components. In other words, the supporting body device preferably has a two-part design. The retaining support part can be connected to the expansion support part, wherein the coupling region connects the retaining support part to the expansion support part. The coupling region is preferably designed to engage behind the expansion support part, wherein the coupling region connects the retaining support part to the expansion support part in a non-positive-fit and/or positive-fit manner. The retaining support part preferably has a plurality of coupling regions, in particular at least or exactly two coupling regions. The retaining support part particularly preferably has the same number of coupling regions as the expansion support part has of expansion regions. The coupling regions on the retaining support part are preferably formed at a distance from one another, as are preferably the expansion regions on the expansion support part, wherein a coupling region engages between two expansion regions. The coupling regions are preferably in the form of wings or flaps or teeth or tabs, wherein the coupling regions are preferably made of a flexible material, for example sheet metal. Alternatively, the coupling regions are designed as the connecting region described above.

Furthermore, the attachment section is clamped between the base body region and the clamping region. The clamping region clamps the attachment section of the contacting device between itself and the base body region, wherein the coupling regions secure the retaining support part on the expansion support part, in particular in the radial and axial direction in relation to the shaft. The clamping region preferably transmits the retaining force to the attachment section, wherein the attachment section is secured in a clamping manner by frictional locking. The attachment section is preferably clamped directly or indirectly between the base body region and the clamping region. The attachment section for mechanically and electrically connecting the contacting device to the supporting body device is particularly preferably clamped in by the base body region and the clamping region. The retaining support part and the expansion support part are preferably made of an electrically conductive material, for example an electrically conductive metal.

The connecting section for the electrical connection to one of the grounding partners is formed by the expansion regions of the expansion support part, wherein the supporting section for the attachment of the attachment section of the contacting device with the contacting section for electrically connecting to the other grounding partner is formed preferably by the base body region and the clamping region, so that the electrical charge and/or voltage of the shaft is and/or can be conducted via the grounding apparatus from the first grounding partner to the second grounding partner.

The electric drive assembly preferably has a bearing unit. The bearing unit has a bearing device, which is used for the, in particular rotatable, bearing of the shaft. In particular, the bearing device is designed as a rotor bearing. The bearing device has a first and a second bearing ring, wherein at least one row of rolling elements is arranged in a rolling manner between the two bearing rings. In particular, one bearing ring is designed as a bearing groove ring, via which the bearing device is supported on the shaft. In particular, the other bearing ring is designed as a bearing outer ring, via which the bearing device is supported on the surrounding structure. The two bearing rings each have a raceway for the rolling elements. The bearing unit is thus designed as a roller bearing, for example as a ball or roller bearing.

In one possible configuration, the supporting body device is designed as a clamping sleeve, in particular as a clamping sleeve section. In particular, the clamping sleeve is designed as a rotationally symmetric hollow body. The clamping sleeve is preferably designed as a separate component which is and/or can be connected in a rotationally fixed manner to one of the grounding partners. For this purpose, the clamping sleeve can be clamped or is clamped radially on the outside or inside of a bearing ring to electrically and mechanically connect the contacting device to the bearing ring via a clamp joint. Thus, the grounding apparatus and the storage device form the storage unit as a common assembly. In particular, the contacting device is captively held on one of the bearing rings via the clamp joint. In principle, the clamping sleeve can be connected to the bearing inner ring and can thus be carried along by the shaft in the direction of rotation when the electric motor is in operation. However, the clamping sleeve is preferably connected to the bearing outer ring and thus remains stationary when the electric motor is in operation. The clamping sleeve is preferably connected to the corresponding bearing ring in a positive-fit and/or non-positive-fit manner in the radial and/or axial direction. For example, the clamping sleeve is pressed onto the bearing outer ring radially on the inside or outside.

The advantage of the configuration is, in particular, that the clamping sleeve makes it possible to mount the contacting device on one of the bearing rings in a particularly simple manner. The grounding apparatus can thus be mounted on or removed from the storage device particularly quickly by the clamping sleeve. For example, the grounding apparatus can be pre-installed on the bearing device via the clamping sleeve, so that the bearing unit can be installed in the drive assembly as a pre-assembled assembly. In addition, a grounding apparatus is proposed which is characterized by a small number of components, so that the grounding apparatus can be manufactured simply and inexpensively.

In a preferred embodiment, it is provided that the supporting body device has a sleeve-shaped connecting section which is designed and/or is suitable for the electrical and mechanical connection of the supporting body device to one bearing ring. In particular, the sleeve-like connecting section is designed in the form of a cylinder sleeve. In addition, the supporting body device has a collar-shaped supporting section which is designed and/or is suitable for the electrical and mechanical connection of the contacting device to the bearing ring. In particular, the collar-shaped supporting section is in the form of a flange and preferably extends in a radial plane of the main axis. When the clamping sleeve is arranged on the outer ring, the flange section is directed radially inwards and extends in the direction of the bearing inner ring. Alternatively, when the clamping sleeve is arranged on the bearing inner ring, the flange section is directed radially outwards and extends in the direction of the bearing outer ring. To form the clamp joint, the contacting device is arranged or held in the axial direction in a positive-fit and/or non-positive-fit manner between the collar-shaped supporting section and the corresponding bearing ring.

In a further embodiment, it is provided that one bearing ring has a cylindrical fastening section which is designed and/or is suitable for receiving the clamping sleeve. For this purpose, the fastening section is arranged on an axial end face of the bearing ring in relation to the main axis. In particular, the fastening section is designed as a cylindrical projection, which is directly connected to the corresponding bearing ring in the axial direction. The fastening section is preferably arranged to be offset in the radial direction with respect to the bearing ring. The radial offset formed thereby corresponds to being equal to or greater than a radial width of the connecting section, so that the clamping sleeve terminates at least flush with an outer circumference of the corresponding clamping ring or is radially offset thereto.

A further object according to the disclosure relates to an electric drive assembly, which is designed in particular as described above, wherein the electric drive assembly has the grounding apparatus as described above.

The electric drive assembly preferably has a separating section, wherein the separating section is arranged between the electric motor section and the transmission section, in particular in the axial direction of the main axis. The partition section includes a partition wall between the electric motor section and the transmission section. In particular, the electric motor section has an engine compartment and the transmission section has at least one transmission compartment, wherein the separating section separates the engine compartment from the adjacent transmission compartment, in particular separates it in a dirt-proof or oil-proof manner. For example, the electric motor section has a motor part housing and the transmission section has a transmission part housing, wherein the separating section is arranged in a separating manner between the motor part housing and the transmission part housing. Preferably, the motor part housing and the transmission part housing together form a housing for the electric drive assembly.

The electric motor section is preferably designed as a dry region. The transmission section, in particular the adjoining transmission compartment, is implemented either as an oil region or as a dry region. In the event that this is implemented as a dry region, the separating section forms a dirt-proof partition. If this is implemented as an oil region, the separating section forms an oil-proof partition.

The shaft, in particular the rotor shaft, is guided through the separating section and sealed off from the separating section with a sealing device. The sealing device can be designed as a contact sealing device or as a non-contact sealing device, in particular as a gap seal. For example, the sealing device is designed as a shaft feed-through. It is further proposed that the grounding apparatus is arranged on a motor side of the sealing device and/or in the electric motor section. Thus, the grounding apparatus is arranged on the side of the electric motor with respect to the sealing device. This has the advantage that the electrical/electronic components are all arranged on the side of the electric motor section, so that the responsibility for the electrical/electronic conversion is assigned to the electric motor section and the responsibility for the mechanical conversion to the transmission section. In addition, the grounding apparatus is installed where the electrical charge and/or electrical voltage is generated in the rotor, so that it can be discharged in a spatially close proximity.

In a preferred embodiment, the shaft is designed as a rotor shaft and is non-rotatably and/or integrally connected to the rotor. The rotor shaft is mounted in the electric motor section via at least one bearing device. The bearing device is preferably designed as a roller bearing device. Provision is preferably made for the grounding apparatus to be arranged between the bearing device and the sealing device. With this configuration, the grounding apparatus is moved further from the free end of the rotor shaft in the electric motor section to the center of the rotor shaft, so that the voltage and/or the electrical charge can be conducted centrally from the rotor shaft as grounding partner to the other grounding partner. In addition, the position particularly protects the transmission section with the transmission device, so that any bearings in the transmission device cannot suffer any damage from the passage of current.

In one possible development, the bearing device is arranged between the rotor and the sealing device as viewed in the axial direction of the main axis. In this way, the grounding apparatus is definitely also shifted to the side of the electric motor that faces the sealing device. The remaining space which is available between the bearing device arranged on the transmission side and the sealing device can thus be used for the grounding apparatus.

As an alternative thereto, the grounding apparatus is arranged on the side of the bearing device which is remote from the sealing device. In particular, this is arranged between two bearing devices, wherein the two bearing devices form the rotor bearing.

BRIEF DESCRIPTION OF THE DRAWINGS

Further features, advantages, and effects according to the disclosure are set out in the following description of the preferred exemplary embodiments. In the drawings.

DETAILED DESCRIPTION

Figure 1:
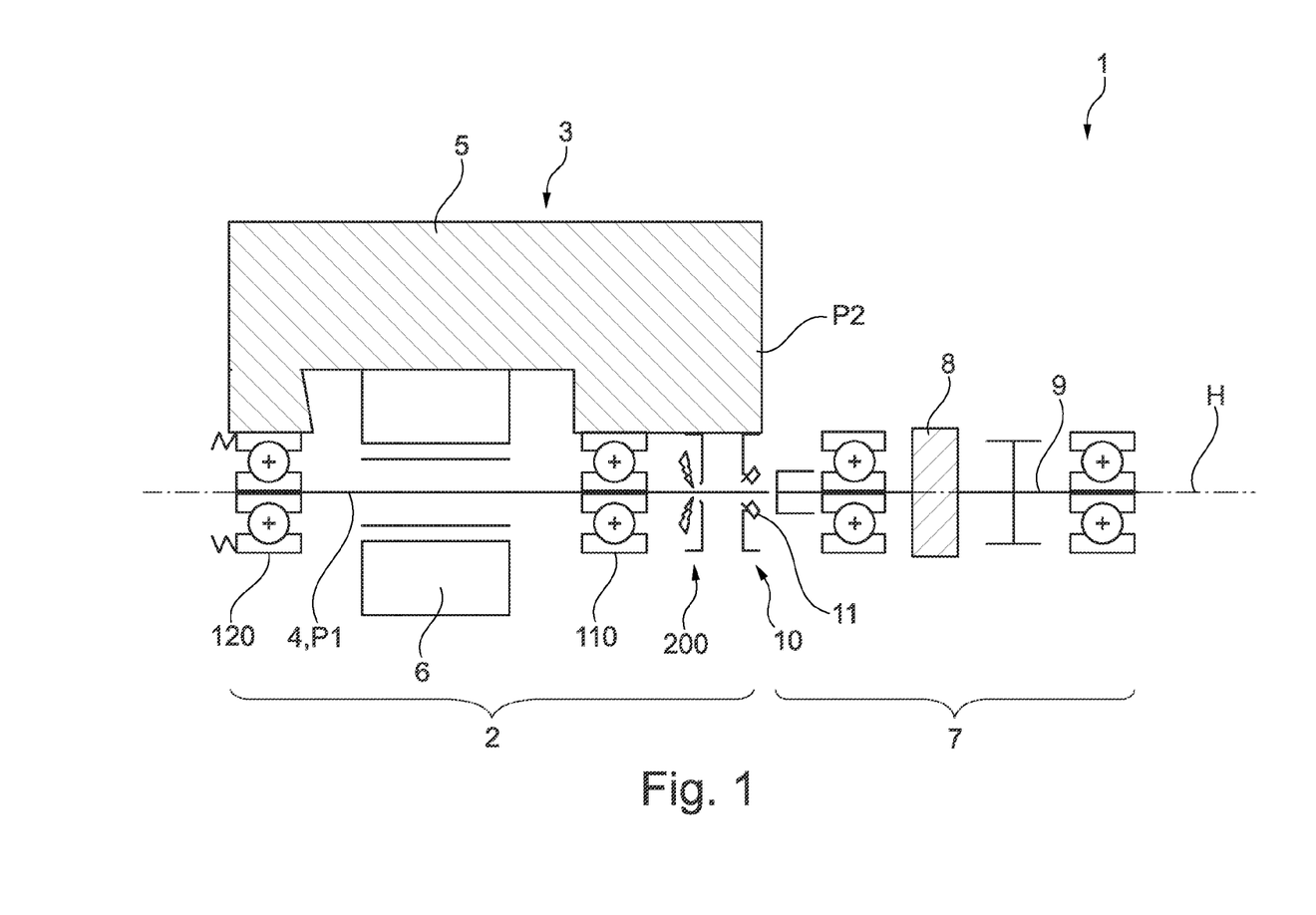
FIG. 1 shows a three-dimensional representation of a drive assembly having a grounding apparatus as an exemplary embodiment.

FIG. 1 shows a schematic representation of an electric drive assembly 1 for a vehicle, not shown, as an exemplary embodiment. For example, the vehicle can be designed as a single or multi-track vehicle and/or as a single or multi-axle vehicle. For example, the vehicle is a purely electric vehicle or a hybrid vehicle. The vehicle is designed, for example, as a passenger car, bus, or truck. Alternatively, however, the vehicle can also be designed, for example, as a bicycle (pedelec), motorcycle (electric motorcycle), or e-scooter.

The drive assembly 1 serves to generate and/or provide a traction torque, in particular a main traction torque, for the vehicle. For this purpose, the drive assembly 1 has an electric motor section 2, which has an electric motor 3 for generating the traction torque and a shaft 4 for transmitting the traction torque. The electric motor 3 can be electrically connected to an energy device, for example a battery or a storage battery, to obtain energy for generating the traction torque. The electric motor 3 can be designed, for example, as a direct current, synchronous, or asynchronous motor.

The electric motor 3 has a stator 5 and a rotor 6. The rotor 6 is drivingly connected to the shaft 4 so that the shaft 4 is driven via and/or by the rotor 6. The shaft 4 is thus designed as a rotor shaft and is connected to the rotor 6 mechanically, for example non-rotatably, and electrically for this purpose. The shaft 4 defines a main axis H with the axis of rotation thereof, wherein with respect to the main axis H, the stator 5 and the rotor 6 are arranged to be coaxial and/or concentric with respect to one another.

For the rotatable mounting of the shaft 4, the electric motor section 2 has a first and a second bearing device 110, 120, wherein the shaft 4 is supported in the radial direction on the stator 5 via the bearing devices 110, 120. In the exemplary embodiment shown, the bearing devices 110, 120 are each designed as a ball bearing, in particular a grooved ball bearing.

Furthermore, the electric drive assembly 1 has a transmission section 7 which is used for the transmission and/or translation and/or distribution of the traction torque of the electric motor 3. For this purpose, a transmission device 8, indicated only schematically, is arranged in the transmission section 7, wherein the transmission device 8 comprises a clutch device, e.g., a positive-fit or pure-fit clutch, and/or a shifting device, e.g., an electrically and/or hydraulically actuatable shift cylinder, and/or a transmission system, e.g., a planetary and/or step-gear transmission. The electric motor section 2 and the transmission section 7 are connected to one another in terms of transmission technology via the shaft 4, wherein the shaft 4 forms an input shaft into the transmission device 8. The traction torque can be passed on to one or more wheels of the vehicle, for example, via an output shaft 9.

Furthermore, the electric drive assembly 1 has a separating section 10 which separates an engine compartment of the electric motor section 2 from an adjacent transmission compartment of the transmission section 7. For this purpose, the separating section 10 is arranged in the axial direction in relation to the main axis H between the electric motor section 2 and the transmission section 7. For example, the engine compartment can be a dry region and the adjoining transmission compartment can be another dry region or an oil region, wherein the separating section 10 forms a dirt-proof and optionally an oil-proof partition between the electric motor section 2 and the transmission section 7. The shaft 4 is guided through the separating section 10 and sealed off from the separating section 10 by a sealing device 11. The sealing device 11 can be designed, for example, as a contact sealing device, e.g., a shaft sealing ring, or as a non-contact sealing device, for example a gap seal.

When the electric motor 3 is operating as a motor, grounding currents can be caused which can discharge via the bearing devices 110, 120 and can damage the bearing devices 110, 120. For this purpose, the electric drive assembly 1 has a grounding apparatus 200, which is used to conduct an electrical charge and/or electrical voltage from the rotor 6 via the shaft 4, as a first grounding partner P1, to a second grounding partner P2.

The second grounding partner P2 forms a stationary grounding partner in relation to the first grounding partner P1, i.e., the shaft 4. The second grounding partner P2 can be formed, for example, through the stator 5 itself and/or through a housing section, e.g., motor housing, and/or a surrounding construction, e.g., chassis, and/or a component which is electrically conductively connected with the stator 5, the housing section, or the surrounding construction. The grounding apparatus 200 forms an electrical connection between the first grounding partner P1 and the second grounding partner P2. In this case, the second grounding partner P2 is connected to ground and/or is grounded, so that the shaft 4 is grounded via the grounding apparatus 200. For this purpose, the grounding apparatus 200 forms a current path with a lower resistance compared to the storage devices 110, 120, so that the grounding currents are conducted in parallel to the storage devices 110, 120. The two grounding partners P1, P2 are continuously electrically connected to one another via the grounding apparatus 200, wherein electrical grounding takes place in both a stationary and dynamic manner, i.e., during engine operation.

In the exemplary embodiment shown, the grounding apparatus 200 is arranged in the axial direction with respect to the main axis H between the first bearing device 110 and the separating section 10 in the electric motor section 2. The grounding apparatus 200 is thus arranged on the side close to the transmission in relation to the first bearing device 110 in the engine compartment. This position close to the transmission allows the transmission section 7 to be protected from grounding currents, so that no bearings in the transmission device 8 are damaged.

Figure 2:
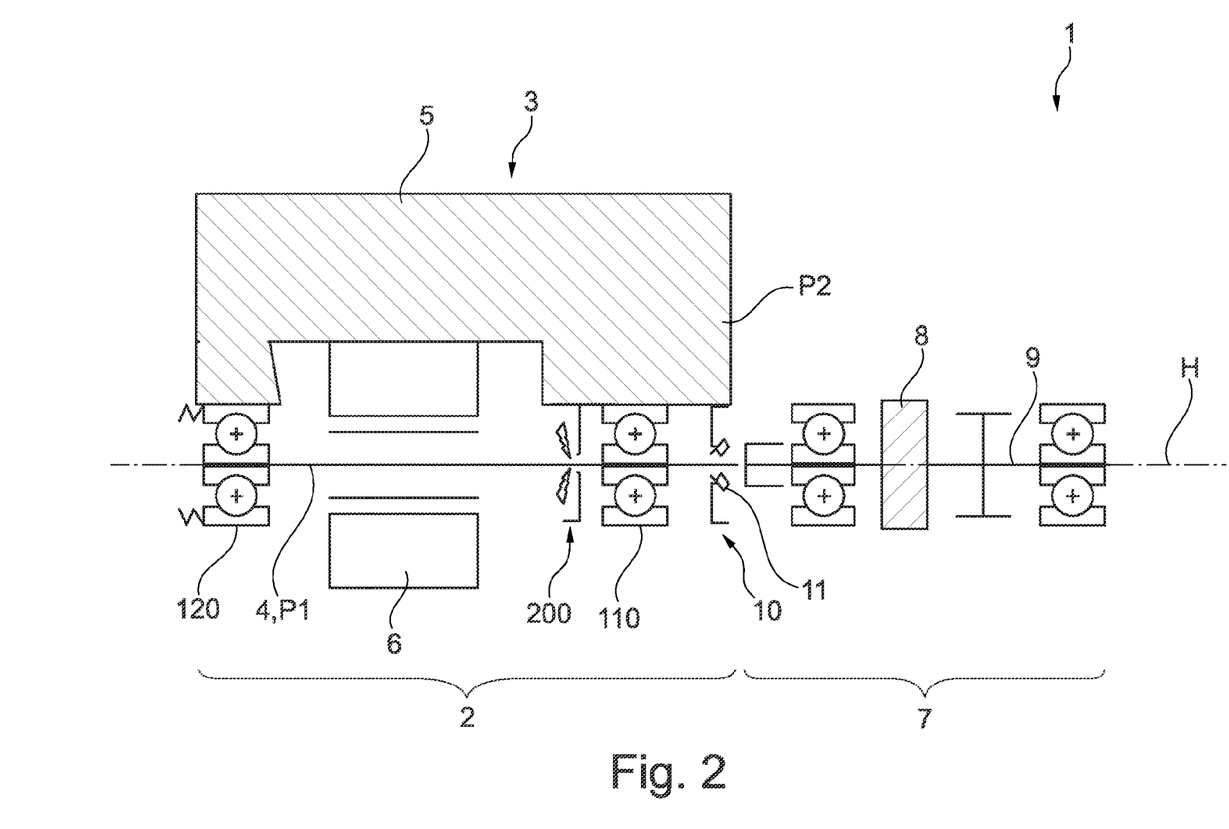
FIG. 2 shows the drive assembly in the same representation as FIG. 1 as a further exemplary embodiment.

FIG. 2 shows the drive assembly 1 in the same representation as FIG. 1 as a further exemplary embodiment. In the exemplary embodiment shown, the grounding apparatus 200 is arranged in the axial direction with respect to the main axis H between the rotor 6 and the first bearing device 110 in the electric motor section 2. The grounding apparatus 200 is thus arranged on the side close to the engine in relation to the first bearing device 110 in the engine compartment. Due to this position close to the motor, the grounding apparatus 200 can be installed where the electrical charge and/or electrical voltage is generated in the rotor 6, so that it can be discharged spatially close.

Figure 3:
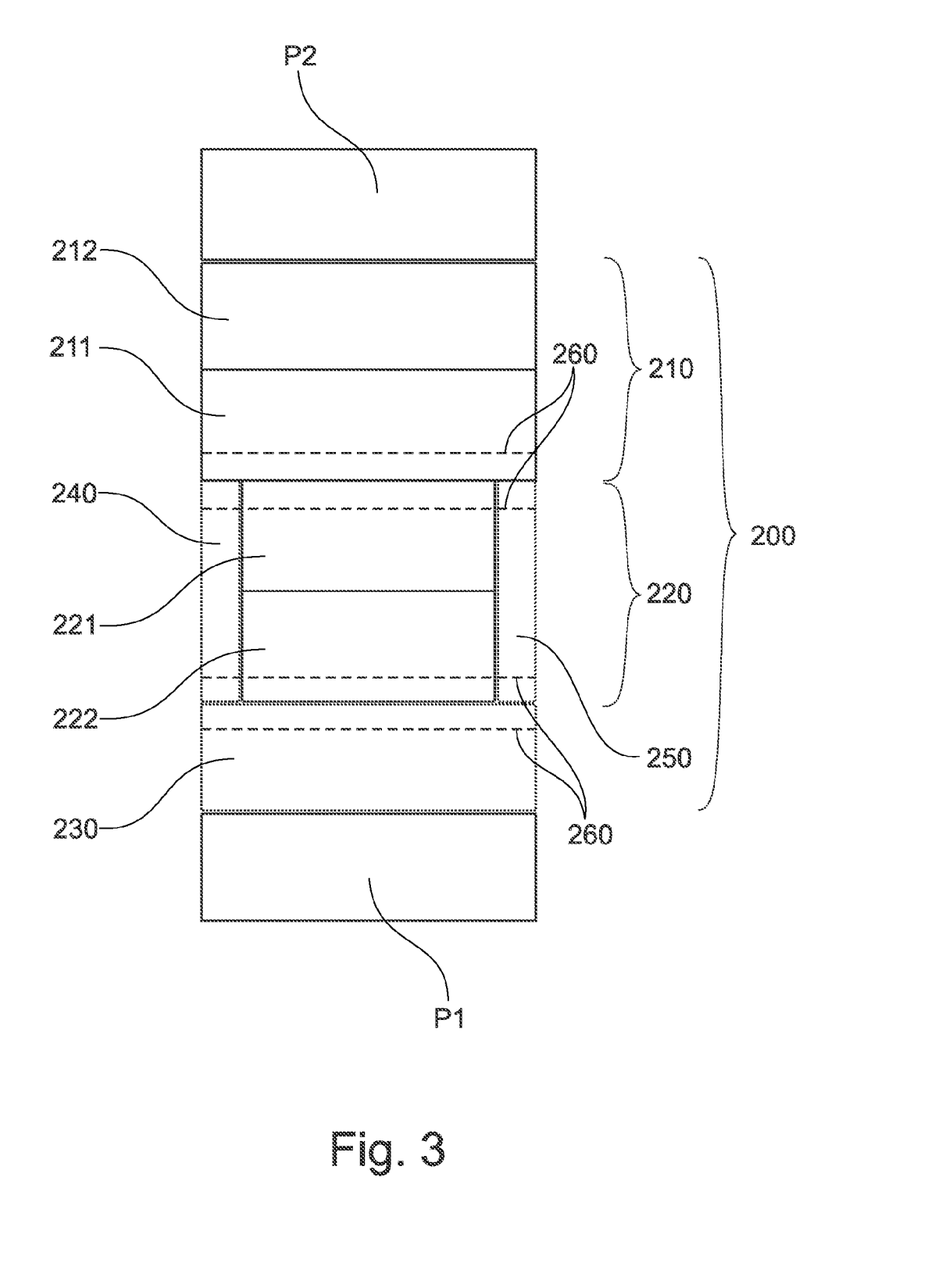
FIG. 3 shows a highly schematic representation of the grounding apparatus of FIGS. 1 and 2.

FIG. 3 shows the grounding apparatus 200 in a highly schematic block diagram, wherein the individual blocks are defined as function blocks and optional configurations are indicated by dotted lines.

The grounding apparatus 200 has a supporting body device 210 and a contacting device 220, the contacting device 220 is electrically and mechanically connected to the supporting body device 210. For this purpose, the supporting body device 210 has a supporting section 211 and the contacting device 220 has an attachment section 221, wherein the contacting device 220 is connected to the supporting section 211 via the connecting section 221, for example in a positive-fit and/or material-fit and/or non-positive-fit manner.

Furthermore, the supporting body device 210 has a connecting section 212 which directly adjoins the supporting section 211. The connecting section 212 is used to mechanically and electrically fix the supporting body device 210 to the second grounding partner P2. The mechanical and electrical connection can coincide, but these can also be implemented side by side or in parallel with one another. The connecting section 212 can be connected directly to the second grounding partner P2 and/or can be in contact therewith. Alternatively or optionally additionally, the connecting section 212 can be connected indirectly to the second grounding partner P2 via an intermediate component, not shown.

The contacting device 220 has a contacting section 222 which directly adjoins the attachment section 221. The contacting section 222 212 serves to make electrically conductive contact between the contacting device 220 and the first grounding partner P1. In motor operation, the shaft 4, i.e., the first grounding partner P1, rotates about the main axis H, wherein the grounding apparatus 200 remains stationary on the second grounding partner P2 and the two grounding partners P1, P2 are in permanent electrically conductive contact with one another via the contacting section 222. The contacting section 222 can be connected directly to the first grounding partner P1, thus the shaft 4, and/or can be in contact therewith. Alternatively, however, the contacting section 222 can also be connected indirectly to the first grounding partner P1 via a sleeve 230 as an optional intermediate component.

During motor operation, wear debris can occur at the contact point of the contacting section 222 with the shaft 4 or the sleeve 230 as a result of the relative rotation between the two grounding partners P1, P2. This wear debris can have electrically conductive particles which must be kept away from the electric motor 3. For this purpose, the grounding apparatus 200 optionally has an abrasion protection device 240 which protects the electric motor 3 against wear debris. For this purpose, the abrasion protection device 240 is arranged on the side of the electric motor 3 of the contacting device 220 to prevent the wear debris from being transferred to the electric motor 3. The abrasion protection device 240 is connected to the supporting section 211 of the supporting body device 210 together with the contacting device 220. Abrasion protection device 240 is designed, for example, in such a way that it shields and/or seals the entire contacting device 220 or at least the contact point between the contacting section 220 and the shaft 4 or the sleeve 230 from the electric motor 3 in relation to the main axis H, both in the axial direction and in the circumferential direction. The abrasion protection device 240 forms a wear debris-tight partition between the first bearing device 110 and the sealing device 10, as is shown in FIG. 1. Alternatively, the abrasion protection device 240 forms a wear debris-tight partition between the rotor 6 and the first bearing device 110, as is shown in FIG. 2.

Optionally, the grounding apparatus 200 can have a further abrasion protection device 250 to prevent the wear debris from being transferred in the other direction, in particular to the transmission section 7. The additional abrasion protection device 250 is connected to the supporting section 211 of the supporting body device 210 together with the abrasion protection device 240 and the contacting device 220. The abrasion protection device 240 is designed, for example, in such a way that it shields and/or seals the entire contacting device 220 or at least the contact point between the contacting section 220 and the shaft 4 or the sleeve 230 from the transmission section 7 with respect to the main axis H, both in the axial direction and in the circumferential direction. The additional abrasion protection device 250 can thus enclose or encapsulate the wear debris between the two abrasion protection devices 240, 250, so that a transfer to the electric motor 3, e.g., through the openings arranged in the grounding apparatus 200, can be ruled out. In addition, the entry of foreign particles from the transmission section 7, for example oil, to the contact point of the contacting device 220 can be prevented by the further abrasion protection device 250.

The grounding apparatus 200 serves to bridge an annular gap between the two grounding partners P1, P2, wherein the grounding apparatus 200 optionally has at least one opening 260 in the annular gap to form an air passage in the axial direction. For example, the opening 260 can be formed by at least or exactly one through-opening, e.g., one or more bores or one or more openings, or by at least or exactly one edge opening, e.g., one or more cutouts. It is conceivable that a large number of through-openings form a grid-like structure, for example, to prevent or at least reduce the transfer of solids, in particular wear debris, to the electric motor 3.

The opening 260, indicated schematically here by a dashed line, can optionally be introduced into the supporting body device 210 and/or the contacting device 220. For example, the opening 260 can be made in the supporting section 211 and/or the attachment section 221 and optionally in the abrasion protection device 240 and/or the further abrasion protection device 250. Alternatively, the opening 260 or optionally a further opening can be introduced into the contacting section 222 and optionally into the abrasion protection device 240 and/or the further abrasion protection device 250. Alternatively, the opening 260 or optionally a further opening can be made in the sleeve 230.

Figure 4A:
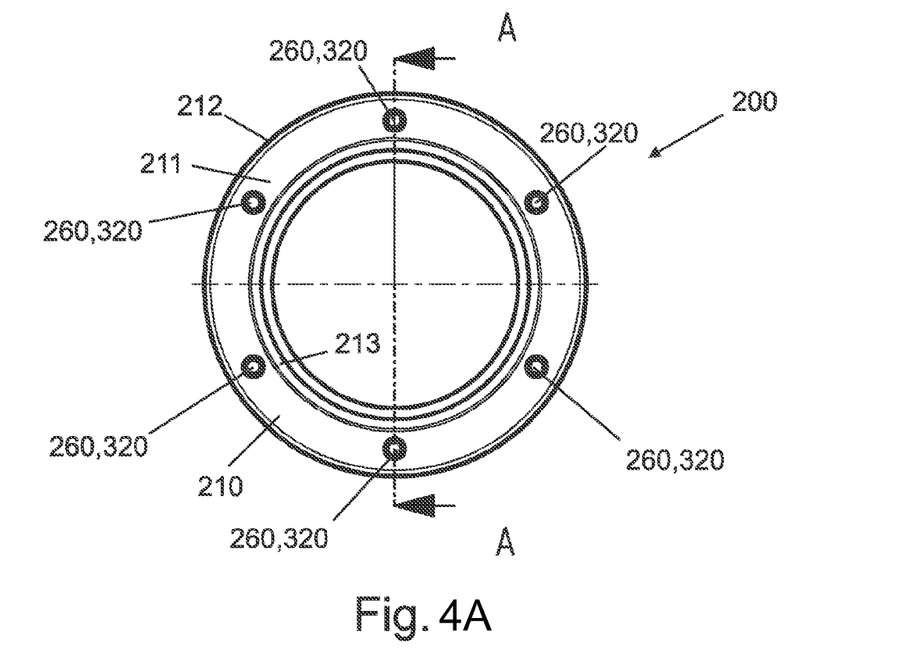
FIGS. 4A, 4B, and 4C show a top view, sectional representation and detailed view of the grounding apparatus of FIG. 3 in a possible structural implementation.
Figure 4B:
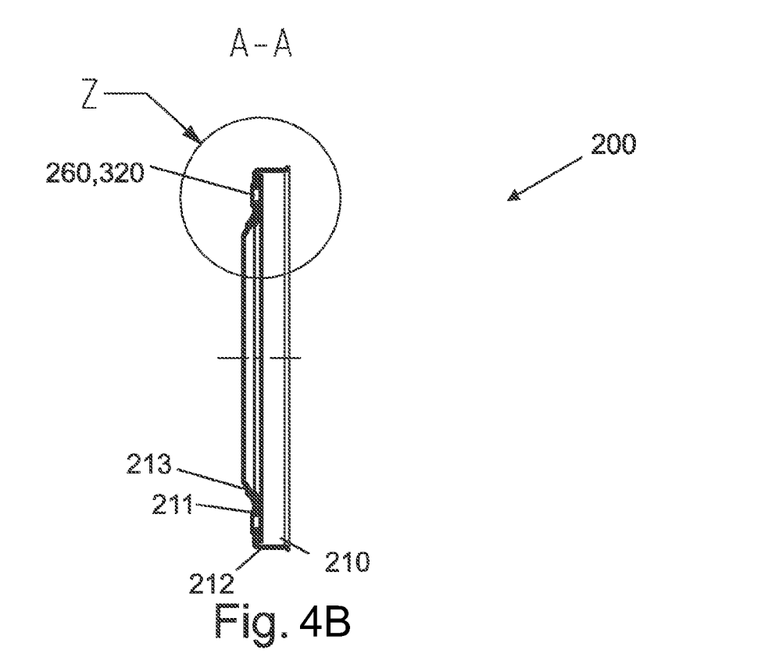
Figure 4C:
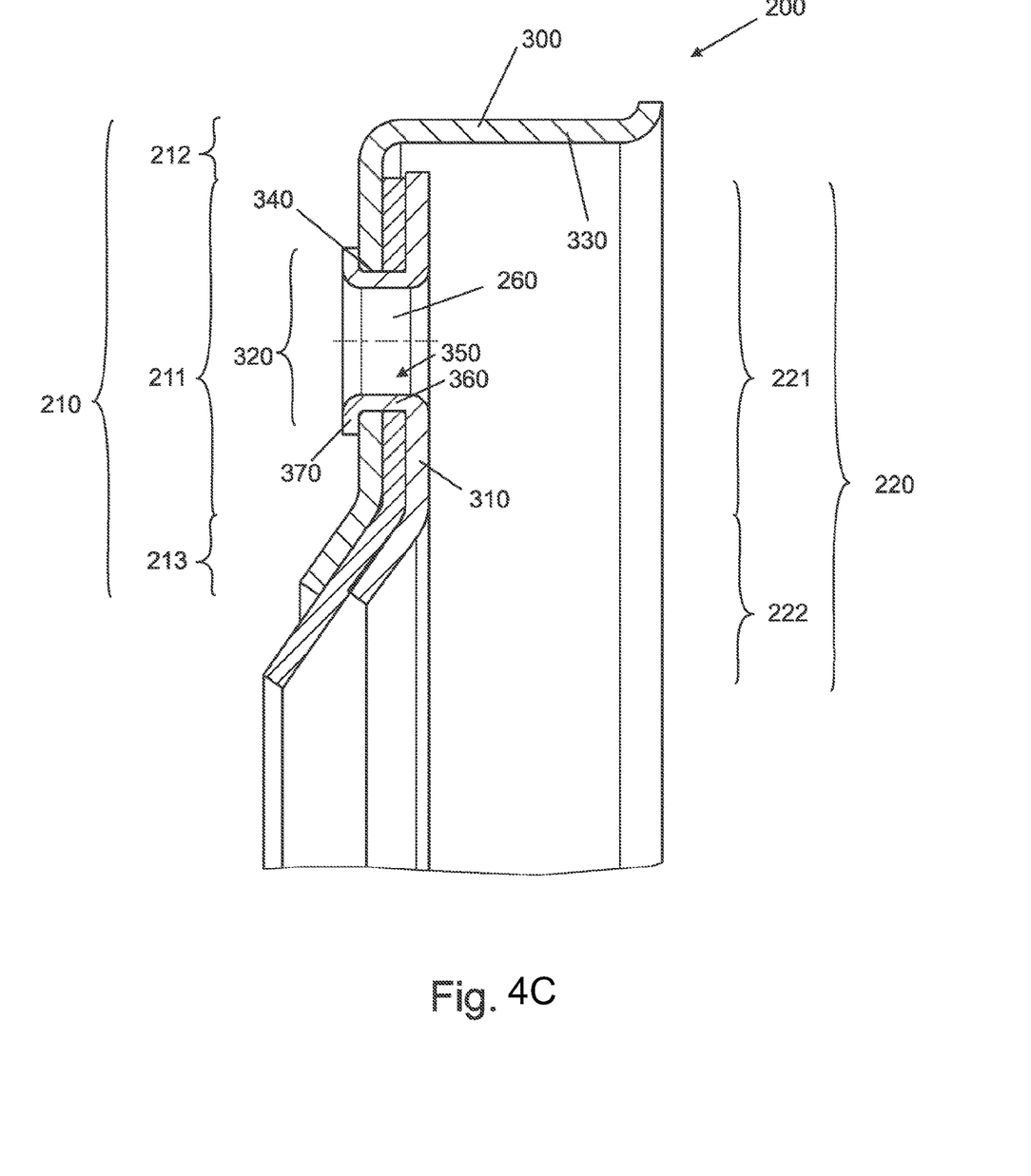

FIGS. 4A, 4B, and 4C show the grounding apparatus 200 as an exemplary embodiment in a top view, sectional illustration and a detailed view. The grounding apparatus 200 is designed as an annular ring component. The grounding apparatus 200 has a plurality of openings 260 which are each closed at the edges and extend in the axial direction. The grounding apparatus 200 has six openings 260 which are regularly spaced apart from one another in the circumferential direction. These form an air passage in an annular gap between the shaft 4 as the first grounding partner P1 and a stationary section of the transmission section 7 as the second grounding partner P2. The outer diameter of the grounding apparatus 200 is dimensioned such that it can be fixed in the stationary section, for example via an interference fit or by means of expansion regions as previously described. As an alternative thereto, the grounding apparatus 200 can be fixed to the first or second bearing device 110, 120 via a clamping sleeve. In this way, the grounding apparatus 200 is electrically and mechanically connected to the second grounding partner P2. The inside diameter of the grounding apparatus 200 is adapted to the outside diameter of the shaft 4, so that it rests against the shaft 4 in a rubbing and/or contacting manner and is electrically connected thereto. If necessary, intermediate elements can be provided between the grounding apparatus 200 and the shaft 4, such as an intermediate sleeve, or the like.

The grounding apparatus 200 has a support part 300 and a retaining part 310, which are each designed as a shaped sheet metal part. For example, these are manufactured by reshaping. The support part 300 is designed as a circular ring part and has the connecting section 212 on the radial outside, which is designed as a sleeve section 330 in this exemplary embodiment. The retaining part 310 is also designed as a circular ring part and is connected to the support part 300 via a plurality of connecting regions 320 using reshaping technology. Together, the support part 300 and the retaining part 310 form the supporting body device 210 with the connecting section 212. The contacting device 220 and optionally additionally the abrasion protection device 240 is/are designed as annular discs and arranged in the axial direction between the support part 300 and the retaining part 310 in the connecting section 212 in a radial plane to the main axis H. Optionally, the support part 300 and the retaining part 310 can bind a clamp joint, between which the attachment section 221 and optionally additionally the abrasion protection device 240 are arranged in a clamped manner. The contacting device 220 is thus fixed in the connecting section 212 with the attachment section 221.

The retaining part 310 is arranged in the sleeve section 330 of the support part 300 and rests on the support part 300 in the axial direction—separated by the contacting device 220 and optionally additionally by the abrasion protection device 240.

In addition, the supporting body device 210 has a supporting section 213 which adjoins the supporting section 211 at an angle to form a support angle. The contacting device 220, in particular the contacting section 222, is supported at an angle on the supporting section 213, forming the support angle. For example, the supporting section 213 is angled at a support angle of 45 degrees relative to the supporting section 211. On the one hand, the supporting section 213 can improve the clamping connection between the supporting section 211 and the attachment section 221, so that the contacting device 220 is secured against slipping out therefrom. On the other hand, a more stable contact of the contacting section 222 on the one grounding partner P1, P2 can be ensured. The supporting section 213 is formed on the one axial side by the support part 300 and on the other side by the retaining part 310.

FIG. 4C shows the connecting region 320 in a detailed view in a sectional representation. The support part 300 has a connecting opening 340 for each connecting region 320 in the connecting section 212. The retaining part 310, on the other hand, has a reshaping region 350 which engages in the connecting opening 340, reaches through it and secures the support part 300 on the retaining part 310 in a positive-fit manner, around which the technical connecting region 320 forms. The reshaping region 350 has a hollow-cylindrical neck 360 which extends in the connecting section 212 in the axial direction and/or perpendicular to the retaining part 310. The opening 260 is formed by the hollow-cylindrical neck 360. A collar 370 adjoins the hollow-cylindrical neck 360, which abuts in the axial direction on the outside of the support part 300 and in this way forms a closing head for the connection in terms of reshaping technology. The collar 370 lies in a radial plane to the main axis H. The reshaping region 350 with the neck 360 and the collar 370 is formed from the retaining part 310 in terms of reshaping technology. For example, pass-through riveting is used as a manufacturing process. The reshaping region 350 also penetrates the contacting device 220 so that it is secured at least in a positive-fit manner and, as already explained above, optionally additionally in a non-positive-fit manner via the clamp joint.

On the one hand, the support part 300, the contacting device 220 and, optionally, the abrasion protection device 240 are connected to the retaining part 310 by means of this manufacturing process in terms of reshaping technology. On the other hand, the openings 260 are made in the connecting region 320 at the same time.

LIST OF REFERENCE SYMBOLS

1 Drive assembly
2 Electric motor section
3 Electric motor
4 Shaft
5 Stator
6 Rotor
7 Transmission section
8 Transmission device
9 Output shaft
10 Separating section
11 Sealing device
110 First bearing device
120 Second bearing device
200 Grounding apparatus
210 Supporting body device
211 Supporting section
212 Connecting section
213 Supporting section
220 Contacting device
221 Attachment section
222 Contacting section
230 Sleeve
240 Abrasion protection device
241 Sealing lip
250 Further abrasion protection device
260 Opening
300 Support part
310 Retaining part
320 Connecting region
330 Sleeve section
340 Connecting opening
350 Reshaping region
360 Hollow cylindrical neck 370 Collar
H Main axis
P1 First grounding partner
P2 Second grounding partner

The invention claimed is:

1. A grounding apparatus for conducting an electrical charge and/or voltage from a rotor of an electric motor via a shaft as a first grounding partner to a second grounding partner, the grounding apparatus comprising:
a supporting body device having a connecting section configured for electrical and mechanical connection to one of the first or second grounding partners, and the supporting body device having a supporting section;
a contacting device having a contacting section configured for electrical connection to an other of the first or second grounding partners, the contacting device having an attachment section, the contacting device being connected to the supporting section of the supporting body device via the attachment section;
wherein the grounding apparatus is configured to bridge an annular gap between the first and the second grounding partners, and wherein the supporting body device is configured as a clamping sleeve which is configured to be arranged on a bearing ring to connect the contacting device electrically and mechanically to the bearing ring via a clamp joint; and
at least one opening, which forms or helps to form an air passage in the annular gap.

2. The grounding apparatus according to claim 1, wherein the opening is configured as a through-opening or as an edge opening.

3. The grounding apparatus according to claim 1, wherein the supporting body device has a support part and a retaining part, which together hold the attachment section, and the support part and the retaining part are connected to one another in at least one connecting region via a reshaping process, and at least the opening is formed by the connecting region.

4. The grounding apparatus according to claim 3, wherein one of the support part or the retaining part has a connecting opening and an other of the support part or the retaining part has a reshaping region which at least engages in the connecting opening to form the reshaping region and maintains the at least one opening free.

5. The grounding apparatus according to claim 1, wherein the contacting section has electrically conductive fibers and an adhesive layer, the electrically conductive fibers are embedded in the adhesive layer, and the electrically conductive fibers on the contacting section are arranged for electrical connection with one of the first or second grounding partners.

6. The grounding apparatus according to claim 1, further comprising at least one abrasion protection device arranged on a side of the electric motor of the contacting device, so that a transfer of wear debris from the contacting device to the electric motor is at least reduced.

7. The grounding apparatus according to claim 6, wherein the supporting section is flanged as a foldover around an edge of the contacting device and the abrasion protection device so that the supporting body device, the contacting device, and the abrasion protection device are connected to each other.

8. The grounding apparatus according to claim 1, wherein the supporting body device has expansion regions for an expansion connection of the supporting body device to one of the grounding partners, and the expansion regions form the attachment section.

9. An electric drive assembly, comprising:
an electric motor section having an electric motor with a rotor and a shaft, the shaft being connected electrically and for torque transmission to the rotor;
a transmission section with a transmission device arranged in the transmission section, the shaft being connected for torque transmission to the transmission device and being connected to the grounding apparatus according to claim 1;
a separating section arranged between the electric motor section and the transmission section; and
a sealing device for sealing the shaft for passage through the separating section, wherein the grounding apparatus is arranged at least one of on an engine side of the sealing device or in the electric motor section.

10. A grounding apparatus for conducting an electrical charge and/or voltage across an annular gap between a shaft, connected to a rotor of an electric motor, as a first grounding partner to a second grounding partner, the grounding apparatus comprising:
a supporting body device having a connecting section configured for electrical and mechanical connection to one of the first or second grounding partners, and the supporting body device having a supporting section;
a contacting device having a contacting section configured for electrical connection to an other of the first or second grounding partners, the contacting device having an attachment section that is connected to the supporting section of the supporting body device; and
at least one opening in at least one of the supporting body device or the contacting device that forms an air passage in the annular gap in an axial direction.

11. The grounding apparatus according to claim 10, wherein the opening is a through-opening.

12. The grounding apparatus according to claim 10, wherein the supporting body device has a support part and a retaining part, which together hold the attachment section, and the support part and the retaining part are connected to one another via upset material formed of a reshaping region of the retaining part extending through a connecting opening in the support part in a connecting region, and at least the opening is formed in the connecting region.

13. The grounding apparatus according to claim 12, wherein the at least one opening is formed through the connecting opening.

14. The grounding apparatus according to claim 10, wherein the contacting section comprises electrically conductive fibers embedded in an adhesive layer, and the electrically conductive fibers on the contacting section are arranged for electrical connection with one of the first or second grounding partners.

15. The grounding apparatus according to claim 10, further comprising at least one abrasion protection device arranged on a side of the electric motor of the contacting device, so that a transfer of wear debris from the contacting device to the electric motor is at least reduced.

16. The grounding apparatus according to claim 15, wherein the supporting section includes an axially extending flange that extends around an edge of the contacting device and the abrasion protection device so that the supporting body device, the contacting device, and the abrasion protection device are connected to each other.

17. The grounding apparatus according to claim 10, wherein the supporting body device has expansion regions for an expansion connection of the supporting body device to one of the grounding partners, and the expansion regions form the attachment section.

18. The grounding apparatus according to claim 10, wherein the supporting body device is configured as a clamping sleeve which is configured to be arranged on a bearing ring to connect the contacting device electrically and mechanically to the bearing ring via a clamp joint.

19. A grounding apparatus for conducting an electrical charge and/or voltage across an annular gap between a shaft, connected to a rotor of an electric motor, as a first grounding partner to a second grounding partner, the grounding apparatus comprising:
- a supporting body device having a connecting section configured for electrical and mechanical connection to one of the first or second grounding partners, and the supporting body device having a supporting section;
- a contacting device having a contacting section configured for electrical connection to an other of the first or second grounding partners, the contacting device having an attachment section that is connected to the supporting section of the supporting body device, wherein the contacting section comprises electrically conductive fibers embedded in an adhesive layer, and the electrically conductive fibers on the contacting section are arranged for electrical connection with one of the first or second grounding partners.

20. The grounding apparatus according to claim 10, wherein the at least one opening extends axially through at least one of the supporting body device or the contacting device to form an unobstructed air passage in the annular gap in the axial direction.

\* \* \* \* \*